United States Patent [19]

Carlson et al.

[11] Patent Number: 5,759,223
[45] Date of Patent: Jun. 2, 1998

[54] HEAT-TREATED CORN GLUTEN MEAL FOR FUNGAL SUPPLEMENTATION

[75] Inventors: Ting L. Carlson, Dayton, Ohio; Karen A. Thornton, Mount Vernon, Iowa

[73] Assignee: Cargill, Incorporated, Minneaplis, Minn.

[21] Appl. No.: 645,260

[22] Filed: May 13, 1996

[51] Int. Cl.$^6$ .............................. C05C 11/00; C05F 11/00
[52] U.S. Cl. ....................................... 71/5; 71/23
[58] Field of Search ......................... 71/5, 23, 26

[56] References Cited

U.S. PATENT DOCUMENTS

| | | | |
|---|---|---|---|
| Re. 22,202 | 10/1942 | Stoller | 71/5 |
| 2,117,315 | 5/1938 | Gössel | 99/98 |
| 2,585,026 | 2/1952 | Moen et al. | 99/80 |
| 2,648,163 | 8/1953 | Szuees et al. | 47/1.1 |
| 2,898,214 | 8/1959 | Ferrel | 99/186 |
| 3,458,303 | 7/1969 | Belak et al. | 71/64 |
| 3,560,190 | 2/1971 | Hughes et al. | 71/5 |
| 3,744,987 | 7/1973 | Omura et al. | 71/64 F |
| 3,903,333 | 9/1975 | Shirley et al. | 427/212 |
| 3,942,969 | 3/1976 | Carroll et al. | 71/5 |
| 4,042,366 | 8/1977 | Fersch et al. | 71/29 |
| 4,059,919 | 11/1977 | Green | 47/1.1 |
| 4,082,533 | 4/1978 | Wittenbrook et al. | 71/28 |
| 4,142,885 | 3/1979 | Heumann et al. | 71/28 |
| 4,333,757 | 6/1982 | Kurtzman | 71/5 |
| 4,337,594 | 7/1982 | Hanacek et al. | 47/1.1 |
| 4,339,456 | 7/1982 | Rushing | 424/274 |
| 4,370,159 | 1/1983 | Holtz | 71/5 |
| 4,420,319 | 12/1983 | Holtz | 71/5 |
| 4,452,008 | 6/1984 | Sandhu et al. | 47/57.6 |
| 4,534,781 | 8/1985 | Wu et al. | 71/5 |
| 4,617,047 | 10/1986 | Bretzloff | 71/5 |
| 4,764,199 | 8/1988 | Pratt et al. | 71/5 |
| 4,990,173 | 2/1991 | Katz et al. | 71/5 |
| 5,030,268 | 7/1991 | Christians | 71/79 |
| 5,290,749 | 3/1994 | Christians et al. | 504/189 |
| 5,291,685 | 3/1994 | Romaine et al. | 47/1.1 |

OTHER PUBLICATIONS

A.D. Carroll, Jr., "Improving Post–Composting Mushroom Supplements For Use At Spawning," Master Of Science Thesis, Pennsylvania State University, Aug. 1973.

*Primary Examiner*—Gary P. Straub
*Attorney, Agent, or Firm*—Fitch, Even, Tabin & Flannery

[57] ABSTRACT

The present invention provides an all-natural, non-chemically modified supplement for increasing the growth and/or crop yield of fungi in a growth medium comprising corn gluten meal having a particle size range of from about 10 to about 40 mesh, having a moisture content of less than about 10% and having a protein content of about 60% or greater of the total weight percent of the corn gluten meal. The present invention also provides processes for preparing the nutrient supplement, compositions containing the nutrient supplement and media and processes for growing fungi.

49 Claims, 8 Drawing Sheets

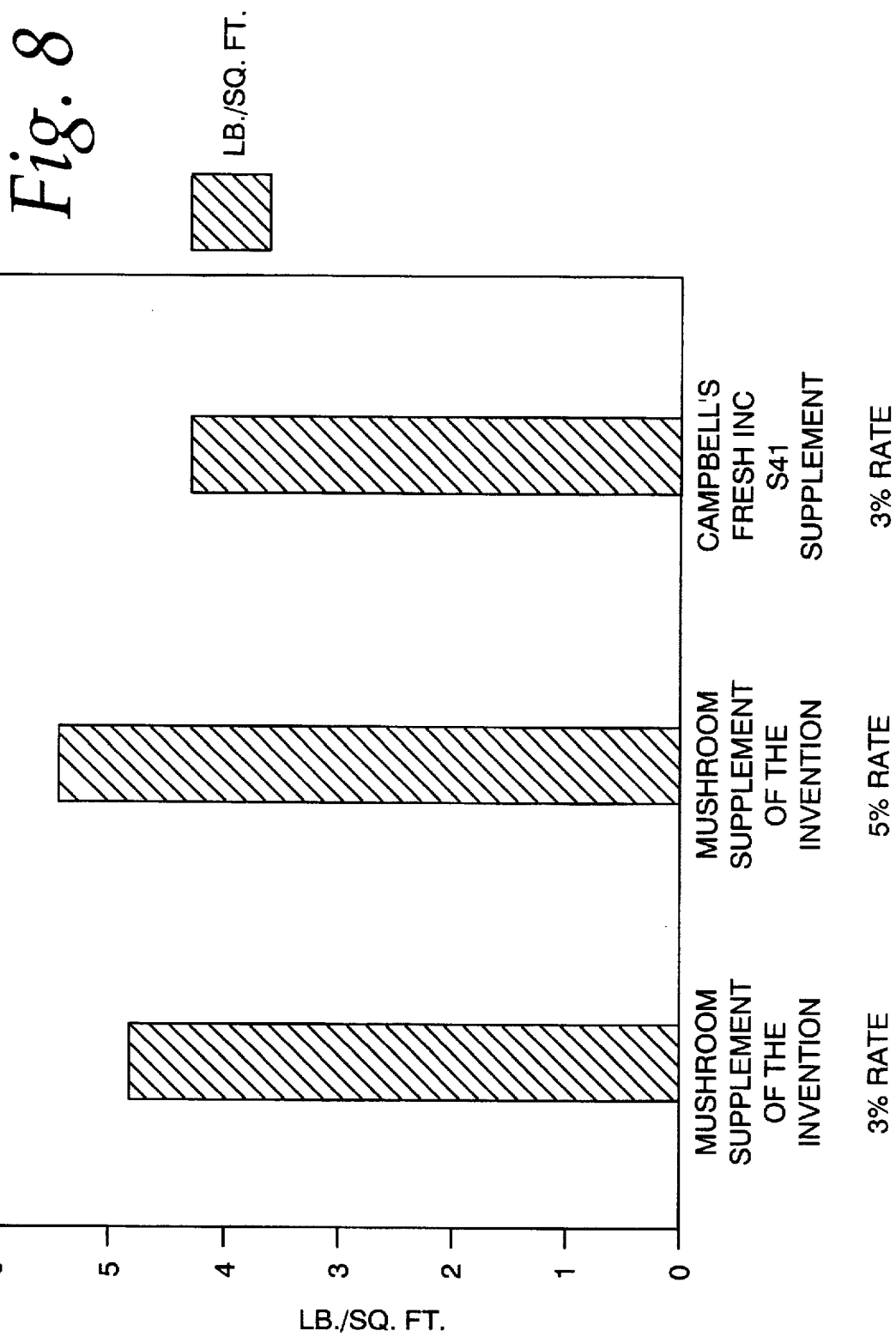

HEAT-TREATED CORN GLUTEN MEAL FOR FUNGAL SUPPLEMENTATION

BACKGROUND OF THE INVENTION

1. Field of the Invention

The present invention generally relates to the art of the production of mushrooms and other edible fungi, and more particularly pertains to a corn gluten meal nutrient supplement for the enhancement of fungal growth and/or crop yield, and a process for enhancing fungal growth and/or crop yield with the supplementation of the growth medium with a corn gluten meal nutrient supplement.

2. Background and Description of Related Art a. Mushroom Growing Practices

As is described by C. J. Alexopoulos et al., *Introductory Mycology* (1979), Six Steps to Mushroom Farming, Pennsylvania State Special Circular 2b8, which is incorporated herein by reference, fungi are microscopic, spore-bearing organisms that lack chlorophyll and, therefore, derive nourishment from dead or living organic matter. Because they share characteristics of both plants and animals, they are classified separately in the Kingdom Myceteae. Within this Kingdom, there are the "filamentous fungi," so named because their vegetative bodies consist of small filaments referred to as "hyphae." Typically, the hyphae grow in a branching fashion, spreading over or within the substrate used as the source of nourishment, thereby forming a network of hyphae called "mycelium." In the life cycle of most filamentous fungi, the mycelium gives rise to either asexual or sexual reproductive bodies bearing spores. The spore is functionally comparable to the seed of higher plants, being important in the dispersal and survival of the fungus in nature. Under suitable environmental conditions, the spore germinates to form another generation) of hyphae and, thus, completes the life cycle of the fungus.

The common edible mushroom (*Agaricus bisporus*) has both vegetative and reproductive ("fruiting") forms. The most familiar form to consumers is the fruiting form (i.e., the mushroom), which has a stalk and an umbrella-shaped cap. The life cycle of this mushroom fungus begins with the germination of a spore, which produces hyphae. A collection of hyphae compact together and form the mycelium. The mycelium then grows and invades the environment as networks. Small masses at the periphery of the network of mycelium enlarge and differentiate to form immature mushrooms called "buttons." The buttons rapidly enlarge and burst through the soil and become mature mushrooms.

Filamentous fungi are best known for their edible, fleshy, sporebearing, reproductive structures known as "mushrooms." Mushrooms have been grown commercially for many years. Throughout these years, commercial production of cultivated mushrooms has increased dramatically. In 1939, worldwide production of *Agaricus bisporus* (also referred to as *Agaricus brunnescens*), the most popular of the edible cultivated mushrooms, was 46,000 tons. By 1982, such production was in excess of 850,000 tons. Mushroom growing has become a multibillion dollar international industry in recent years. The mushrooms then produce spores which germinate and produce further mycelium.

Commercial mushroom growing depends upon composted materials as a medium for growth. Generally, a compost is first formed, and then it is treated in a manner that the microorganisms present therein are stimulated to make the compost suitable for colonization by the mushrooms.

The general procedure for commercially producing mushrooms involves an initial step of impregnating a suitably prepared growth medium with mushroom mycelia or spawn. This step is referred to as "spawning," and is generally performed in a plurality of individual beds or trays to facilitate handling and to economize space. The compost provides the nutrients, such as amino acids, which are essential for mycelium growth. The compost is often prepared from a mixture of horse manure and straw suitably treated, according to procedures known by those of skill in the art, to yield a final composition promotive of mushroom growth. The mycelium-impregnated compost is then allowed to develop under carefully controlled conditions of temperature and moisture, until the hyphae of the mycelium have permeated the compost. This process usually takes from about two to three weeks. At this time, the mycelia-permeated compost is covered with a thin layer of soil or sand and, optionally, peat. This step is referred to as "casing," and the presence of this top layer causes the mushrooms to "flower," i.e., to form the fleshy fruiting body harvested as the product. It generally takes about three weeks after the beds are cased for the first mushrooms to appear. After harvesting the first crop of mushrooms, the bed goes through another growth cycle in which additional mushroom fruits are produced. These growth cycles are referred to as "breaks," and a commercial compost bed generally undergoes three to five breaks before the compost becomes significantly depleted in essential nutrients. The compost is then discarded and the procedure is initiated anew.

It has heretofore been known to supplement compost with various protein-rich, lipid-rich supplements, including dried blood, corn meal, soybean meal and many other supplements. Typically, supplements are added at the time when the compost is inoculated with the mushroom fungus. Supplements may also be mixed with the compost at casing, or can be added during the mushroom production cycle.

Unprocessed corn gluten meal has heretofore been employed unsuccessfully in mushroom growing. The mushroom industry has generally heretofore taken the position that unprocessed corn gluten meal is unsuitable for nutrient supplements due to a predicted heat buildup in nutrient beds. Thus, the mushroom industry has generally exhibited a preference for soybean-based nutrient supplements.

One disadvantage of many of the additives employed to supplement spawned compost is a significant temperature increase and increase in heat evolution in the compost, which is caused by increased metabolic rates of the mushroom mycelium, and from high biological activity of other microorganisms utilizing the nutrients for their growth. This temperature increase endangers or destroys the mushroom mycelium, and can destroy the growing mushroom crop. Temperature excursions above 35° C. (95° F.) have been observed.

A disadvantage of many other additives employed to supplement compost is that they not only stimulate the mycelial growth of the mushroom, but they also promote the growth of competing microorganisms present in the compost, such as molds. Such competing microorganisms may pre-exist in the compost, may be introduced into the compost with a supplement, or may be introduced into the compost via airborne contamination. These competing microorganisms reduce the availability of the added nutrients for the mushroom mycelium, and hinder the development of the slower-growing mycelium.

One feature of many commercial supplements is that the availability of nutrients is delayed until the mushroom fungus has thoroughly invaded the compost, thereby minimizing early utilization of the nutrients by competitive microorganisms within the compost. Mechanisms of delayed-release nutrients include formaldehyde-denaturation of the protein and encasing the protein in a water-repellent film containing the fungicide Mertect (thiabendazole). These techniques are disclosed in U.S. Pat. Nos. 3,942,969, 4,370,159, 4,534,781, and 4,617,047. However, because each of these techniques employs chemical pesticides, their future in the mushroom industry may be limited. Formaldehyde has been restricted by the Environmental Protection Agency, and the State of California now requires the monitoring of workers handling the product employing formaldehyde-denatured protein for exposure to formaldehyde. The supplement employing thiabendazole was previously banned in Canada, although its use is now permitted.

Mushrooms are generally grown in a series of flushes, or harvests. A single spawning into a compost may product 5 to 8 flushes and, in some instances, as many as 12, or as few as 4, flushes. A disadvantage of other additives employed to supplement compost is that stimulated mushroom crop yields occur only in the first few flushes, or harvests. The additives appear to be rapidly depleted, such that little or no mushroom yield stimulation is observed in later flushes.

Considering the emerging trend towards the reduced usage of chemicals in agriculture, there is an important need to develop an environmentally-safe, delayed-release supplement for mushrooms. An all-natural additive which increases the yield of mushroom fruit per given area is of great commercial value to the mushroom grower.

The present invention overcomes disadvantages inherent with various fungal nutrient supplements, compositions and methods currently being employed by mushroom growers. The present invention provides fungal nutrient supplements, compositions and methods for their preparation and use, which permit safe, economical, and convenient application in the commercial production of mushrooms and other edible fungi with greatly reduced "heating" of the resulting mushroom crop, and with an increased yield of mushrooms.

b. Description of the Related Art

Each of the documents described hereinbelow discloses compost additives, composition and/or processes which are different from the additives and processes of the present invention. Thus, the fungal nutrient supplements, compositions and processes of the present invention are distinct from that which has been described in the art.

U.S. Pat. No. 3,942,969 discloses the stimulation of mushroom growth and crop yield through the use of denatured protein as a nutrient supplement. The growth of mushroom mycelium is stimulated by admixing the denatured protein into a compost in which the mushrooms are to be grown before or after spawning, but prior to the establishment of the mushroom mycelium in the compost. Denaturing of the protein is defined as reducing the solubility of protein by changing the molecular structure of the globular protein by rupturing hydrogen bonds, which is induced by any of the methods known in the art, such as by heating the protein with temperatures of from 250° F. to 450° F., or by exposing it to formaldehyde, acids or alkalies. Column 8, Lines 5–6, of this patent discusses cottonseed protein which was heat denatured by heating at 375° F. for 2½ hours. Column 4, Lines 21–28, of this patent states that exemplary mutable protein sources usable in the invention are meals from corn germ and corn gluten. Column 7, Lines 23–28, of this patent discusses whole soybeans which were ground through a 0.078 inch mesh screen.

U.S. Pat. No. 4,059,919 discloses a method and apparatus for the hydration and/or cooking of a particulate material, such as grain, which is to be used as a nutrient medium for mycelium growth in the production of mushrooms. The particulate material is heat treated under pressure with water in liquid or vapor phase, and then is flash cooled under reduced pressure and sterilized. The particulate material is agitated throughout these operations, and the treated sterile material is fed into sterile containers under aseptic conditions.

U.S. Pat. No., 4,370,159 discloses a nutrient for use in enhancing fungus growth which is in the form of conglomerate particles including an irregularly-shaped matrix particle of denatured protein and a plurality of growth enhancer droplets of fatty oil and phospholipid material, protein material and mycelium growth stimulators attached to the matrix particle at various recessed attachment position, and methods for preparing such nutrient. Column 5, Lines 27–29, of this patent discloses the conglomerate nutrient particles as having an approximate radius of 65 to 18 Tyler mesh.

U.S. Pat. No. 4,420,319 and International Application No. PCT/US80/01136 disclose a combination "activator-delayed release nutrient ('DRN') particle" as a growth-inducing additive for use with mushroom fungus. The additive has a diameter in the neighborhood of 500 microns ($5.0 \times 10^{-2}$ cm), or a sieve profile of greater than 80%, +48 Taylor sieve mesh, and comprises: (1) a small radius (a diameter in the neighborhood of 200 microns, $2.0 \times 10^{-2}$ cm), approximately spherical "activator particle" which is adapted to induce enzyme synthesis within a cell, and which has a core of high food value liquid lipids; (2) a thin layer of "antioxidant-surfactant material" (easily digestible polyunsaturated oil surrounded by a thin vitamin-surfactant layer) which surrounds each activator particle, which is adapted to reduce cell aging by inhibiting free radical formation and which includes tocopherols; and (3) an exterior layer of "activated protein solids" which microencapsulate the antioxidant-surfactant material, which have a protein concentration in excess of 92% by weight, which are water-soluble, and which are readily utilized by the mushroom mycelium. The mushroom mycelium are stated to preferentially attack the activator particles as a food source. The "DRN particle" is made up of two distinct components, an oil drop (a vegetable-type oil which may readily be assimilated and digested by the mushroom cell) and a denatured protein layer. The proteins of the "activator particle" are denatured less than those of the DRN particle. Methods for the preparation of such additive are also disclosed, and are intended to produce high-quality mushrooms within a shorter period of time than with other methods.

U.S. Pat. No. 4,534,781 discloses a mushroom nutrient supplement for enhancing the growth of mushroom mycelium in a compost bed comprising a particulate, primarily non-denatured, nutrient supplement having at least a partial coating of hydrophobic material, such as a paraffin wax, that is not readily assimilable by competing microorganisms in the compost, whereby the coating delays the availability of the nutrient to the mushroom mycelium while the coating is gradually removed under the conditions of mushroom growth. Column 2, Lines 55–58, of this patent describes the particulate nutrient supplement as comprising any material which is known to beneficially enhance the growth of mushrooms. The hydrophobic coating may also include a component for inhibiting the growth of molds. Column 3, Lines 38–40, and Column 5, Lines 13–15, of this patent disclose the pasteurization of the supplement to about 60° C.

to 65° C. (140° F. to 150° F.) for two to six hours. This patent also discloses a method of making the supplement and a method for using the supplement to enhance the growth of mushroom mycelium.

U.S. Pat. No. 4,617,047 discloses a particulate nutrient supplement for enhancing the growth of mushroom mycelia in a compost bed which can be added to the compost either at spawning or up to casing, and which comprises a combination of a protein-containing nutrient, such as cracked soybeans and pelletized soybean fines, and a composition for inhibiting the growth of molds in the compost bed. The mold inhibitor composition may be coated onto the protein-containing nutrient, or may be incorporated throughout a particulate nutrient supplement formed by pelletizing finely-divided protein-containing particles. It may also be admixed with additional hydrophobic material which may or may not be assimilable by competing microorganisms in the compost. "Particulate" is defined in Column 3, Lines 1–4, of this patent as meaning particle sizes on the order of at least about $\frac{1}{25}$ (0.04), and preferably about $\frac{1}{16}$ (0.0625), of an inch. Column 6, Lines 20–22, of this patent states that soybeans cracked to about $\frac{1}{6}$ to $\frac{1}{10}$ the size of the whole soybeans have been found to be suitable for use in the invention. Column 4, Lines 25–29, and Column 5, Lines 32–34, of this patent state that conditions are adjusted to avoid denaturing (degrading) the protein-containing nutrient, and discuss a temperature range of between about 75° F. and 115° F. Column 5, Lines 27–29, of this patent states that the supplement can be pasteurized by heating to about 60° C. to 65° C. (140° F.–150° F.).

U.S. Pat. No. 4,764,199 discloses a mushroom growing supplement which is prepared from acidic (pH of 2.0 to 5.5) corn gluten meal by mixing the corn gluten meal with aqueous formaldehyde in order to denature the protein of the corn gluten meal while maintaining the meal in a free-flowing condition. The treated corn gluten meal is described in Column 3, Lines 8–10, of this patent as having a moisture content of no higher than 16.0%. The treated corn gluten meal is subsequently packaged without heating or drying, and can be added to mushroom composts at spawning and/or at casing. A small amount of corn steepwater solids can be incorporated into the corn gluten meal in order to reduce the amount of fines (particles which pass through a 100 mesh screen) in the corn gluten meal. Because no excess formaldehyde is present in the product, no removal of the formaldehyde is required.

U.S. Pat. No. 4,990,173 and European Pat. Application Publication Number 0 290 236 A2 disclose a granular, hydrophilic nutrient supplement for enhancing the growth of mushrooms in a compost bed comprising a major amount (from 75% to 99% by dry weight) of a protein-rich, inner core of substrate material, such as corn gluten meal, which, preferably, is not denatured, and a minor amount (up to 25% by dry weight) of a hydrophilic carbohydrate coating material.

U.S. Pat. No. 5,291,685 discloses the use of certain intact, whole plant seeds, such as rapeseed, which have been treated, for example, with heat at 90.5° C. (195° F.) for 24 hours in a drying oven or autoclaving at 121° C. (252° F.) for 1.5 hours (Column 4, Lines 25–29) to cause loss of the ability to germinate as delayed-released nutrient supplements for use in commercial mushroom cultivation. The treated seed may be added to the compost at spawning in order to increase the yield of the mushrooms.

SUMMARY OF THE INVENTION

The present invention provides an all-natural, non-chemically modified nutrient supplement (additive) for enhancing the growth and/or crop yield of mushrooms and other edible fungi in a growth medium comprising corn gluten meal having a particle size range of from about 10 to about 40 mesh, having a moisture content of less than about 10% and having a protein content of about 60% or greater of the total weight percent of the corn gluten meal.

The present invention also provides a nutrient composition comprising a supplementally-effective amount of the above-described nutrient supplement and an agriculturally-acceptable carrier vehicle.

The present invention further provides a medium for growing mushrooms and other edible fungi which comprises the admixture of the above-described nutrient supplement and a fungal growth medium.

The present invention also provides a process for growing mushrooms and other edible fungi comprising supplementing the nutrients present in growth medium containing growing fungi with the above-described nutrient supplement, wherein the supplement is admixed into said growth medium during a time period commencing at the time of spawning of the mycelium into said growth medium and ending at the time of casing.

The present invention still further provides a process for making the above-described nutrient supplement for enhancing the growth and/or crop yield of mushrooms and other edible fungi in a growth medium comprising:

(a) obtaining all-natural, non-chemically modified corn gluten meal in the form of a slurry having a protein content of about 60% or greater of the total weight percent of the corn gluten meal;

(b) heating (heat drying) the corn gluten meal slurry obtained in step (a) at a temperature of from about 100° C. (212° F.) to about 120° C. (248° F.) for a period of time of from about 30 minutes to about 300 minutes, such that the corn gluten meal has a moisture content of less than about 10%; and (c) sizing the heat-dried corn gluten meal product of step (b) to a particle size range of from about 10 to about 40 mesh.

BRIEF DESCRIPTION OF THE DRAWINGS

FIG. 8 is a graph which shows the results of the farm-scale mushroom growing trial described in Example 9 in terms of pounds of mushrooms yielded per square foot of growth medium for two different mushroom supplements: (1) Campbell's Fresh, Inc. S41 supplement (U.S. Pat. No. 4,534,781) applied at a 3% rate of supplementation on a dry compost weight basis; and (2) the mushroom supplement of the present invention applied at both a 3% and a 5% rate of supplementation.

DETAILED DESCRIPTION OF THE INVENTION

1. Definitions

Figure 1:
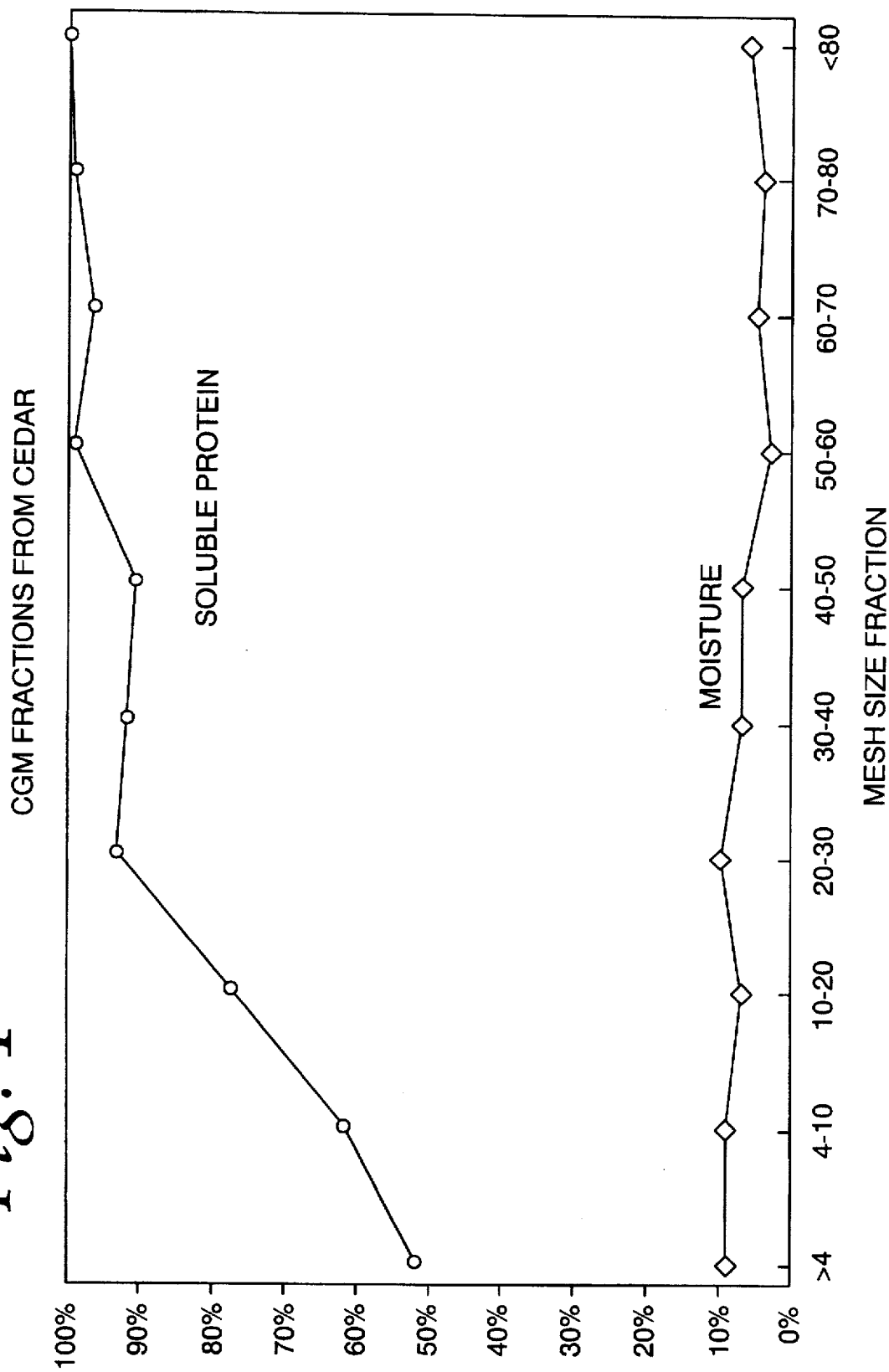
FIG. 1 is a graph which plots the results obtained in the experiment described in Example 1 hereinbelow in terms of percent of soluble protein released from, and percent moisture content of, untreated corn gluten meal having a wide range of particle sizes (mesh size fractions of >4 to <80).

For purposes of clarity, the terms and phrases used throughout this specification and in the appended claims are defined in the manner set forth directly below.

The phrases "agricultural formulation," "agricultural composition" and "nutrient composition" as used herein mean a product which results from the combining of one or more of the fungal supplements of the present invention with one or more other ingredients, such as carriers or other materials described hereinbelow which are agriculturally acceptable.

The term "agriculturally acceptable" as used herein refers to those compounds, materials, substances and compositions which are, within the scope of sound agricultural judgment, suitable for use in fungi growing, and which are compatible with other ingredients employed in a formulation or composition containing the nutrient supplements of the invention.

The terms "casing" and "capping" as used herein mean covering a mycelia-permeated compost bed with a thin layer of soil, peat, sand and/or other suitable material known by those of skill in the art after the mycelia have suitably developed. This allows the mushrooms to fruit or "flush" by producing sporophores. The casing acts as a support for the heavy mushroom caps so that they do not fall over and break the delicate roots through which they receive their sustenance, and also prevents the surface of the compost layer from drying out.

The term "compost" as used herein means a substrate upon which mushrooms can be grown, which serves as a source of nutrients, such as amino acids, which are essential for mushroom growth. Composting materials include horse manure, straw and wood and wood products (sawdust, woodchips, etc.), corn cob and other vegetative waste material and other materials known by those of skill in the art, or combinations of these materials. The various media appropriate for a particular fungus are known in the art. (Because mushrooms are incapable of producing sufficient amounts of their own amino acids, mushrooms must obtain amino acids from the substratum on which they grow.) Compost is generally pasteurized, for example, by heating in a manner known by those of skill in the art, such as for two to six hours at 60° C. to 65° C. (140° F. to 150° F.) in order to deactivate any residual microorganisms. A commercial compost bed generally undergoes three to five breaks before the compost becomes significantly depleted in essential nutrients and, thus, is discarded.

The term "composting" as used herein means forming a nutrient substrate, such as a compost bed, upon which mushrooms can be grown.

The term "cropping" as used herein means harvesting the developed mushrooms.

The terms "flush," "break" and "harvest" as used herein mean a fresh crop of mushrooms on the compost bed. (Mushrooms appear on the compost beds at intervals of about 7 to 10 days. There are approximately 5 progressively decreasing flushes which are harvested in a full crop of mushrooms, lasting about 7 to 8 weeks.)

The term "hyphae" as used herein means rootlike threads which develop from spores which germinate within the growing medium to search for nutrients, absorb them and transmit them to the fruit (the mushroom).

The terms "mycelium" and "spawn" as used herein mean a fused mass formed by a multitude of branchings and criss-crossings of hyphae. It is from the mycelium or spawn that the mushroom develops.

The term "spawning" as used herein means the impregnation or inoculation of a compost bed with mushroom mycelia (inocula).

The term "spore" as used herein means the asexual seed of the mushroom, or other fungus.

The phrase "supplementally-effective amount" as used herein means an amount of the fungal supplement of the invention which is effective for increasing fungal growth and/or crop yield beyond the growth and crop yield which would result without the use of the supplement.

Temperatures discussed herein may be in units of the Celsius degree (°C., $1/100$ the difference between the temperature of melting ice and that of water boiling under standard atmospheric pressure), or in units of the Fahrenheit degree (°F., $1/180$ of the above-described difference). For example, 100° C. corresponds to 212° F., and 120° C. corresponds to 248° F.

2. Description of Invention a. General Information

In one aspect, the present invention provides an all-natural, delayed-release, sized corn gluten meal supplement (additive) for enhancing (increasing) the growth and/or crop yield of mushrooms and other edible fungi in a growth medium comprising corn gluten meal having a generally uniform particle size range of from about 10 to about 40 mesh (i.e., the particles will pass through about a 10 mesh screen, but are retained on about a 40 mesh screen), preferably from about 10 to about 20 mesh, having a moisture content of less than about 10% and having a protein content of about 60% or greater of the total weight percent of the corn gluten meal. The particle sizes of the supplements of the present invention, thus, generally range from about 0.0787 of an inch to about 0.0165 of an inch. In the experiments described hereinbelow, a corn gluten meal supplement of the present invention has increased mushroom yields by approximately 20% to 50%.

The heat conditions which are applied to the corn gluten meal starting materials during the preparation of the supplements of the present invention are significantly greater than pasteurizing conditions.

Microbial growth on a substrate material, such as the additives of the present invention, require a certain degree of hydration and most molds except for certain Aspergilli, require substantial moisture content in order to flourish. The reduction of the moisture content of the supplements of the invention to below about 10% may advantageously diminish or eliminate competing growth from other microorganisms, such as mold.

The control of the size of the particles of the supplements of the present invention advantageously controls the protein release rate from the supplements, so that the protein nutrients are controlled, and are slowly released during the cultivation of the mushrooms or other edible fungi.

The optimum particle size of the supplements of the present invention provides a mushroom nutrient supplement which has a controlled (slower) nutrient release rate, which allows the mushroom fungus to outcompete other compost microorganisms and, thus, provides for improved mushroom yield, and which avoids causing excessive heating within the compost bed.

The particle size of the corn gluten meal is the important characteristic in determining its suitability for use as a nutrient supplement for mushrooms and other fungi.

Data which is presented in the experiments described hereinbelow show that the use of smaller particles of corn gluten meal (greater than about 40 mesh) resulted in poor spawn growth. Smaller particles may release nutrients to the compost bed more rapidly and, hence, cause the compost bed to heat up faster and have excessive heat surges.

Data which is presented in the experiments described hereinbelow show that the use of larger particles of heat-treated corn gluten meal (less than 10 mesh) provided moderate spawn growth, as larger particles may not distribute as evenly in the compost bed. Some large pieces of supplement were not attacked by mushroom fungus, and some green mold growth was evident on the supplement.

The corn gluten meal supplements of the present invention may, optionally, be coated with a hydrophobic coating material including, but not limited to, natural resins, such as shellac, natural waxes, such as beeswax and paraffin waxes, oils, such as vegetable and mineral oils, animal fats, synthetic, low-melting or solvent-soluble polymers and other like materials for the purpose of reducing hydration of the supplements and, thus, reducing an essential precondition for rapid attack by molds. Vegetable oils such as safflower, cottonseed, soybean, corn, olive, linseed, peanut, rapeseed, sesame, wheat germ, sunflower seed and palm oil can be used in the present invention. Both assimilable and nonassimilable hydrophobic materials may be used in the present invention. When using an assimilable material, however, high coating levels (generally above about 4% to 5%) should be avoided because such coating levels may tend to degrade performance.

The corn gluten meal starting material may be agglomerated in a manner known by those of skill in the art with one of the above-described materials and water, and then the agglomerated product may be heat-dried and sized in the manner described hereinabove.

When the supplement of the invention which is coated in the manner described above is added to mushroom compost, the coating will be gradually removed under the conditions of mushroom growth. The coating delays the availability of the protein nutrient to the mushroom mycelium while the coating is gradually removed.

Specific fungal supplements within the scope of the invention include, but are not limited to, the nutrients discussed in the examples presented below.

Contemplated equivalents of the fungal supplements described herein include fungal supplements which otherwise correspond thereto, and which have the same general properties thereof, wherein one or more simple variations are made which do not adversely affect the efficacy of the supplement.

In another aspect, the present invention provides a nutrient composition comprising a supplementally-effective amount of a corn gluten meal additive described herein and an agriculturally-acceptable carrier vehicle.

In yet another aspect, the present invention provides a medium for growing mushrooms and other edible fungi which comprises the admixture of a corn gluten meal additive described herein and a fungal growth medium.

In still another aspect, the present invention provides a process for growing mushrooms and other edible fungi comprising supplementing the nutrients present in growth medium containing growing fungi with a corn gluten meal additive described herein, wherein the supplement is admixed into the growth medium at the time of spawning of the mycelium into the growth medium or at the time of casing.

In another aspect, the present invention provides a process for preparing a corn gluten meal additive for enhancing the growth and/or crop yield of mushrooms and other edible fungi in a growth medium comprising: (a) obtaining a corn gluten meal slurry, for example, as a by-product of corn wet milling processing; (b) heat-drying the corn gluten meal slurry at about 100° C. (212° F.) with, for example, a steam tube drier, for an amount of time which is sufficient to provide a corn gluten meal product having a moisture content of below about 10%, which is generally from about 30 minutes to about 300 minutes; and (c) sizing the heat-dried product resulting from step (b) so that it has a particle size range of from about 10 to about 40 mesh, preferably from about 10 to about 20 mesh. The resulting corn gluten meal will have a moisture content of below 10% and a protein content of 60% or greater of the total weight percent of the composition. This process is environmentally advantageous in that it does not use any chemical additives, such as formaldehyde, or chemical treatments.

The most preferred embodiment of the present invention is the nutrient described in Example 6 hereinbelow.

The appropriate rate of application of these supplements will be suitably selected by methods which are consistent with conventional mushroom growing practices.

b. Varieties of Fungi

The fungal nutrients of the present invention may be employed to enhance the growth of any species, strain and/or variety of mushroom or other edible fungi. Examples of edible fungi which may be employed in accordance with the present invention include, but are not limited to, those of the species *Agaricus bisporus, Agaricus brunnescens, Agaricus bitorquis,* Auricularia spp., Boletus spp., Cantharellus spp., *Lensinula edodes, Panoeolus venenosus,* Pleurotus spp., *Tremeila fuctformis, Calvatia gigantea, Flammulina velutipes,* Morchella spp., *Philota namelco, Stropharia rugoso-annluate, Volvariela volvacea, Psalliota campestris, Psalliota Rodmani, Psalliota jabaceus, Pleurotus ostreatus, Polyporus umbellatus, Cantharellus cibarius, Clavaria stricta, Tricholoma rutilans, Morchella esculenta, Morchella bispora, Gyromitra esculenta* and *Helvella elastica.* c. Fungal Compositions

The fungal supplements of the present invention may comprise one or more of the fungal supplements described herein as an active ingredient in admixture with one or more agriculturally-acceptable carriers and, optionally, with one or more other compounds, soluble carbons, food stuffs, nitrogen sources, vitamins, minerals, stabilizers, nutrients, additives, carriers and/or other materials which may be necessary or useful for fungal growth. These supplements and compositions are employed agriculturally, and would generally be used by a commercial mushroom grower. The appropriate rate of application of these supplements will be suitably selected by methods which are consistent with conventional mushroom growing practices, as described in more detail hereinbelow.

Sources of soluble carbon include carbohydrates, such as glucose, galactose, mannose, fructose, maltose, xylose, arabinose, dextrin, mannitol, sucrose, starch, sorbitol, lactose, rhamnose, etc., as well as natural sources of carbohydrates, such as the hot water extract of straw, molasses, grain, potatoes, fruits, whey, etc., and their by-products, fats and oils such as vegetable oils, animal fats, etc., proteinaceous materials such as whey, blood meal, oil seed meals, alfalfa, brewer's by-products, distiller's by-products and the like.

As a nitrogen source, one may employ alfalfa press juice, monosodium glutamate, peptone, amino acids, urea, ammonium hydroxide, proteins, chicken manure, ammonium sulfate, ammonium phosphate, ammonium nitrate, calcium nitrate and the like.

Minerals which may be employed in these compositions include, for example, salts of calcium, phosphorus, sulphur, magnesium, potassium, iron, zinc, manganese, etc.

d. Advantages of the Fungal Supplements

The following advantages have been observed through the preparation and use of the fungal supplements of the present invention:

(1) Proper use of the fungal supplements of the invention does not result in excess heating which damages the mushroom mycelia.

(2) The method for preparing the fungal supplements of the invention is efficient, and is easily accomplished.

(3) The fungal supplements of the invention have been shown to increase mushroom crop yields by approximately 20% to 50%, as is described in more detail hereinbelow.

(4) The fungal supplements of the invention are all-natural, non-chemically modified supplements.

(5) The fungal supplements of the invention may be applied to a growth medium employed for growing mushrooms and other fungi during the time of spawning of the mycelium into the growth medium or at the time of casing.

(6) Use of corn gluten meal, which is a relatively inexpensive by-product material, as a starting material for the fungal supplements of the invention results in fungal growth supplements which are more economical than some of the other additives which are currently employed by mushroom growers.

3. Utility The supplements of the present invention increase mushroom growth and/or crop yield and, thus, are useful for increasing the growth and/or crop yield of mushrooms and, perhaps, other fungi in the commercial mushroom growing industry. The fungal supplements, as additives to the growth medium for mushrooms and other edible fungi, have been found to increase mushroom growth and/or crop yield by as much as 50%. These supplements would also be useful for the enhancement of the growth and/or crop yield of other types of edible fungi.

4. Methods of Preparation a. Corn Gluten Meal

Corn gluten meal is commercially available as a co-product of corn milling from many sources, such as from Grain Processing Corporation (Muscatine, Iowa) or Corn Product, Corp. (Argo, Ill.). As is known by those of skill in the art, corn gluten meal is generally made by drying the liquid gluten stream separated from corn during corn wet milling processing. In the wet milling process of corn, the corn is steeped in sulfur dioxide-containing water, and the following fractions are obtained: corn starch, corn oil, defatted corn germ, corn hulls, corn steep liquor and corn gluten meal (the protein fraction). The acid condition of the sulfur-dioxide-containing water remains during the production of the corn gluten meal by-product, which typically has a moderately acid pH (approximately 3 to 4). Corn gluten meal is typically separated from the starch stream by centrifugation to yield a thick, yellow slurry of corn gluten meal containing 15 to 20% solids. Conventionally, corn gluten meal is filtered and dried to produce solid corn gluten meal, which is sold as an animal feed product. Corn gluten meal is typically composed of the materials listed below.

| Corn Gluten Meal Component | % Dry Basis |
|---|---|
| Protein | 60–70% |
| Carbohydrate | 20–25% |
| Fat | 3–5% |
| Ash | 3–5% |

Typically, corn gluten meal contains a substantial amount of fines, particles which pass through a 100 mesh screen.

b. Methods For General Synthesis

In general, the fungal supplements of the present invention may be prepared by the methods illustrated in the following general synthesis scheme, or by modifications thereof, using readily-available starting materials, reagents and conventional preparation procedures.

A corn gluten meal slurry may be obtained in the manner described hereinabove, or by other methods, or from other sources, known by those of skill in the art.

The corn gluten meal starting material is heat-dried by any method known by those of skill in the art, such as with an oven, with a steam tube drier or by flash drying. Current process technology typically utilizes a flash dryer. The heat drying is generally performed at a temperature of from about 100° C. (212° F.) to about 120° C. (248° F.), preferably at about 100° C. (212° F.), from about 30 minutes to about 300 minutes, such that the resulting corn gluten meal has a moisture content of less than about 10%.

The heat-dried corn gluten meal is then sized to a particle size ranging from about 10 to about 40 mesh, preferably from about 10 to about 20 mesh, by methods known by those of skill in the art. For example, the heat-dried corn gluten meal could be crumpled through two spinning rollers, and then the resulting particles could be sifted through 10 to 40 mesh sieves to obtain the desired final products of about 10 to 40 mesh in size.

The corn gluten meal supplements of the present invention may, optionally, be coated with a hydrophobic material in a manner known by those of skill in the art, for example, by pelleting or agglomeration methods. For general information concerning the pelleting process, see H. Pfoust, "Effect on Lignan Binders, Die Thickness and Temperatures on the Pelleting Process," *Feedstuffs*, 36(22), 20 (1964) and A. Yound, "Colloidal Binders and Other Factors on Pellets," *Feedstuffs*, 34, 36–38 (1972), each of which is incorporated herein by reference.

General Synthesis Scheme

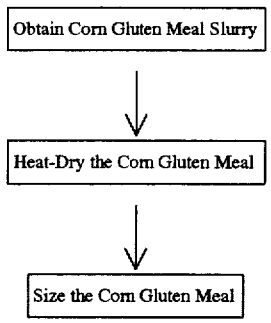

The conditions for carrying out the individual steps in the general reaction scheme presented above are conventional, well-known and capable of wide variation.

Other methods known in the art can also be used to synthesize the fungal supplements of the present invention.

c. Procedures For Implementing Supplement Into Growth Media

Generally, in practicing various embodiments of this invention, a compost suitable for promoting the growth of mushroom mycelium is initially prepared.

A summary of conventional approaches to compost preparation is present in W. A. Hayes, *Composting* (W. S. Maney and Son, Ltd., Leeds, England, 1977), which is incorporated herein by reference. (Mushrooms, typically, are grown in discrete, dark houses, in large, flat, wooden beds stacked about 8 to 10 feet high and about 2 feet apart. These mushroom houses are maintained under carefully-controlled environmental conditions. The beds are generally prepared by filling them to a depth of about 6 to 8 inches with a carefully-formulated compost.)

The compost may be pasteurized to kill harmful pathogens, for example, by heating the compost for two to six hours at from about 60° C. to about 65° C. (from about 140° F. to about 150° F.). Details of this procedure are well-known by those of skill in this art.

The supplement of this invention is compatible with any type of compost. Suitable materials for preparing the compost include those described hereinabove.

Once the compost is prepared, mushroom spores may be either mixed in with the compost prior to filling the trays to be used for growing the mushrooms, or may be implanted as spawn in the compost after filling the beds. The basic methods for producing mushroom spawn have been described in a number of United States patents. These patents include U.S. Pat. No. 1,869,517, U.S. Pat. No. 2,005,365, U.S. Pat. No. 2,044,861 and U.S. Pat. No. 3,828,470, each of which is incorporated herein by reference. Alternatively, the spawn may be obtained from commercial sources known by those of skill in the art.

The supplement of the invention can be dispersed into the growing media at the time the mushroom spawn is being dispersed into the compost or at the time of casing the compost bed, either alone, or in combination with one or more other various supplements or additives, such as those described hereinabove. The supplement may be mechanically admixed into the compost bed with the mycelia, for example, of *Agaricus bisporus* (Stoller Laboratories, Santa Cruz, Calif.), with a rotary drum or tumbler. The supplement is provided in a particulate form which allows it to be added to the compost bed using readily-available spawning equipment known by those of skill in the art. For general information concerning the supplementation of fungal growth media, see L. Schisler, *Applied Agricultural Research*, 5:44–47 (1990), which is incorporated herein by reference.

The supplement is generally added to the bed at a rate of application similar to existing commercial mushroom supplements, which is generally in the range of from about 1% to about 6% on the dry weight basis of the compost in the bed. The rate of application in any particular case is based upon a number of factors including the mushroom or fungal variety employed, the compost formulation and the mushroom grower's particular conditions, such as air quality and flow, temperature, cooling capacity, moisture, pH, humidity, $CO_2$ level, bed depth, composting conditions and the like. The compost may be spawned with either liquid or solid spawn of the variety of mushroom to be cultivated. There will be an economically-defined upper limit for the supplementation rate. Optimization of the rate of application can be routinely determined by those of skill in the art, and different variations may occur. A person having skill in the art can readily determine the supplementally-effective amount of the mushroom supplement of the present invention required to increase mushroom and other fungal growth and/or crop yield. For example, the mushroom grower could start applications of the fungal supplement of the invention at levels lower than that required in order to achieve the desired agricultural effect and gradually increase the application until the desired effect is achieved. An upper limit of addition is usually determined when over-heating occurs.

In general, a suitable application of a mushroom supplement of the present invention will be that amount of the fungal supplement which is the lowest amount effective to produce a positive effect (an effect any greater that which would have been achieved without the use of any fungal supplement of the invention). Such an effective amount will generally depend upon the factors described above. Generally, application levels in the range of from about 1% to about 6%, more preferably from about 3% to about 5%, of mushroom supplement of the invention based upon the dry weight of the compost in the bed is applied. However, the total usage of the fungal supplement of the invention will be determined by a mushroom grower or other like individual having skill in the art within the scope of sound agricultural judgement.

While it is possible for a fungal supplement of the present invention to be administered alone, it is also possible to administer the fungal supplement as an agricultural formulation (composition).

Formulations (compositions) of the present invention containing the fungal supplements of the invention may be prepared by any of the methods which are known in the arts of mushroom growing specifically, or agriculturally, generally. The amount of fungal supplement of the invention which can be combined with one or more other ingredients in a single application form will vary depending upon the compost being employed, the species or strain of mushroom being grown, the particular mode of administration and all of the other factors described hereinabove. The amount of fungal supplement of the invention which can be combined with another material to produce a single application form will generally be that amount of the mushroom supplement which is the lowest amount effective to produce any increase in mushroom or other fungi growth or crop yield. Generally, out of one hundred percent, this amount will range from about one percent to about ninety-nine percent of fungal supplement.

Methods for preparing these formulations or compositions are known by those of skill in the art, and include the step of bringing into association a fungal supplement of the present invention with a carrier and, optionally, with one or more accessory ingredients.

The spawned compost beds are then allowed to develop under carefully-controlled conditions known by those of skill in the art until the mycelia have completely permeated the compost. The present invention does not require any special provisions, and conditions normally employed for growing mushrooms can be advantageously employed. This process will usually take about two to four weeks. The beds are then cased with a layer of soil, sand, peat or other suitable casing material known by those of skill in the art. If the supplement was not added at the time of spawning, it is done at this time. This is simply done by admixing the supplement into the compost bed prior to applying the layer of casing material. Generally, the first crop of mushrooms can then be harvested about three weeks after casing. The mushroom bed then goes through additional growth cycles in which additional flushes are produced. Generally, a commercial bed will undergo three to five such growth cycles before the compost is replaced.

The procedure for growing and harvesting mushrooms and other edible fungi is conventional, and is known by those of skill in the art. A further description of the process of mushroom cultivation can be found in the books R. Singer, *Mushrooms and Truffles* (Leonard Hill Ltd., London 1961), and P. Flegg et al., *The Biology and Technology of the Cultivated Mushroom*, (1985), each of which is incorporated herein by reference.

d. Packaging of Fungal Supplement

The fungal supplements of the present invention can be placed into containers for shipment to mushroom growers. For example, flexible bags may be employed. Typically, such bags are formed of multilayered kraft paper and will hold 50 pounds of the product. However, other types and sizes of packages or containers may also be used.

While the various aspects of the present invention are described herein with some particularity, those of skill in the art will recognize numerous modifications and variations which remain within the spirit of the invention. These modifications and variations are within the scope of the invention as described and claimed herein.

5. Examples

The following examples describe and illustrate the methods for the preparation of the fungal supplements of the present invention, as well as other aspects of the present invention, and the results achieved thereby, in further detail. Both an explanation of, and the actual procedures for, the various aspects of the present invention are described where appropriate. These examples are intended to be merely illustrative of the present invention, and not limiting thereof in either scope or spirit. Those of skill in the art will readily understand that known variations of the conditions and processes of the preparative procedures described in these examples can be used to prepare the fungal supplements of the present invention, and the agricultural compositions comprising such compounds.

In the examples, all parts are by weight unless otherwise indicated.

Unless otherwise indicated in a particular example, all starting materials and pieces of equipment employed in the examples are commercially available. Sources for these starting materials and pieces of equipment include Stoller Laboratories (Santa Cruz, Calif.), the Mushroom Supply Co. (Toughkenomon, Pa.), Grain Processing Corporation (Muscatine, Iowa) and Corn Products, Corp. (Argo, Ill.).

All patents and publications referred to in the examples, and throughout the specification, are hereby incorporated herein be reference, without admission that such is prior art.

EXAMPLE 1

Soluble Protein and Moisture Levels of a Wide Range of Sizes of Untreated Corn Gluten Meal In this experiment, the percent of soluble protein and the percent of moisture of a wide range of particle sizes of untreated corn gluten meal were evaluated.

FIG. 1 is a graph which shows the results of this experiment, and reveals that the percent of soluble protein increases as particle size decreases due to faster release of the soluble protein.

EXAMPLE 2

Composition of Untreated Corn Gluten Meal Having Different Particle Sizes

In this experiment, the protein, starch, fiber and fat content in terms of percent weight of the total composition was calculated for untreated corn gluten meal having different particle size ranges.

Figure 2:
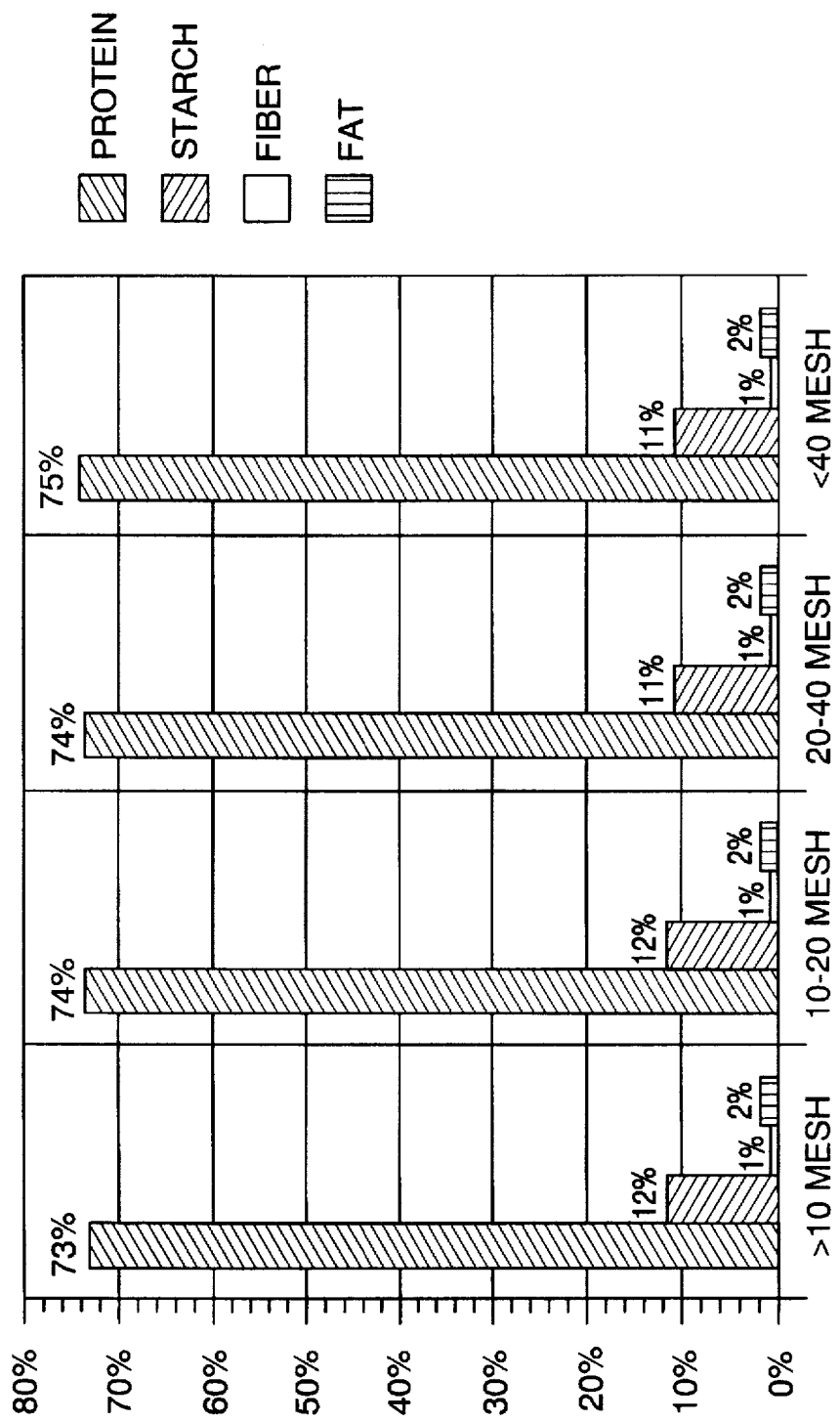
FIG. 2 is a graph which shows the protein, starch, fiber and fat content of untreated corn gluten meal having different particle sizes for the experiment described in Example 2.

The results of this experiment are shown in FIG. 2.

EXAMPLE 3

Soluble Protein and Moisture Levels of Untreated Corn Gluten Meal Heated Over Time In this experiment, the percent of soluble protein and the percent of moisture of untreated corn gluten meal dried in a 100° C. (212° F.) oven over different periods of time was evaluated.

Figure 3:
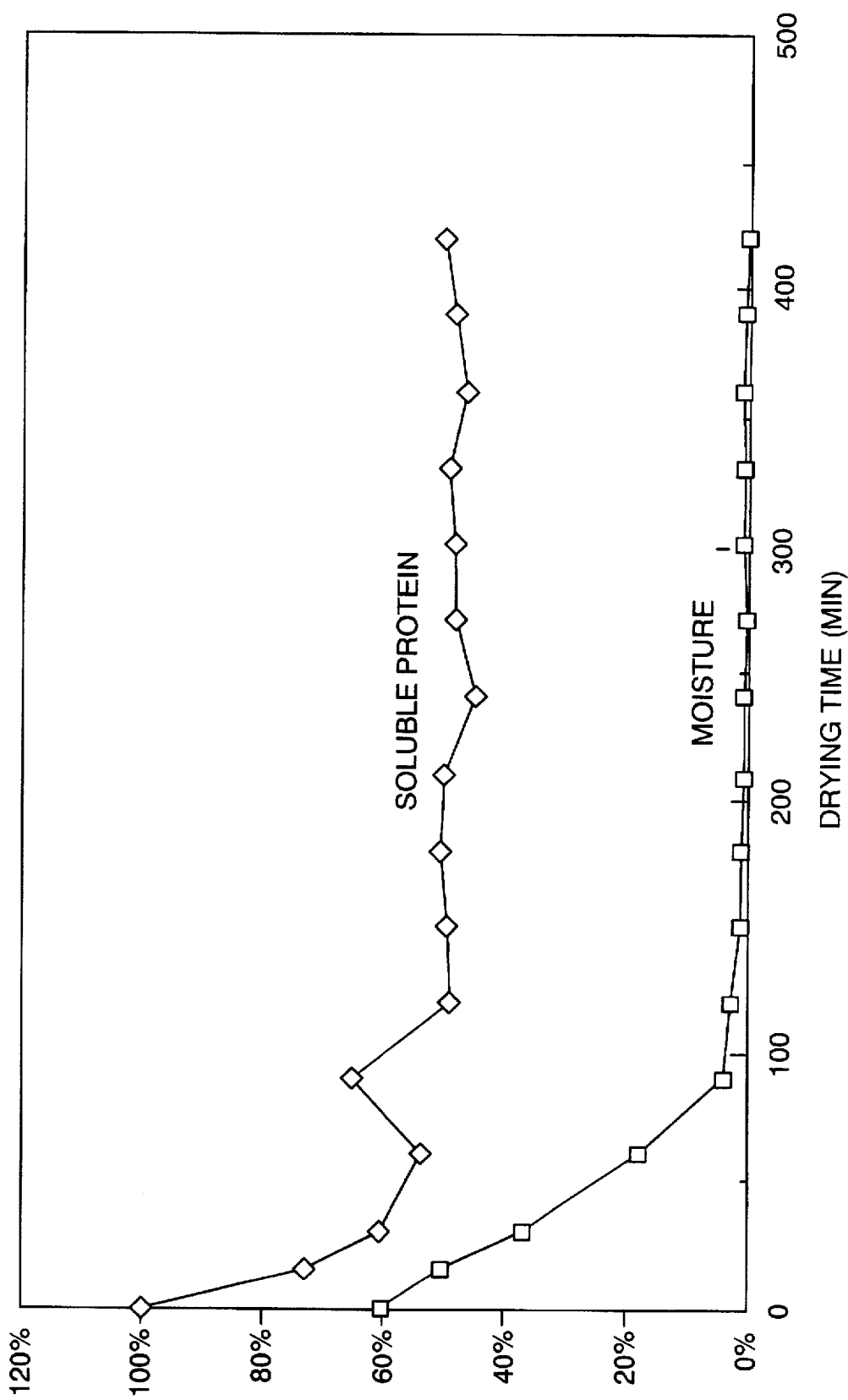
FIG. 3 is a graph which plots the results obtained in the experiment described in Example 3 in terms of percent of soluble protein released from, and percent moisture content of, untreated corn gluten meal dried in a 100° C. oven over different periods of time.

FIG. 3 is a graph which shows the results of this experiment, and reveals that heating for excessive periods of time results in a decrease in the percent of moisture of the untreated corn gluten meal, and that excess drying time does not change the protein solubility in corn gluten meal.

EXAMPLE 4

Soluble Protein Level of 10–20 Mesh Size Corn Gluten Meal in Different Buffers Heated at Different Temperatures In this experiment, the percent of soluble protein of 10–20 mesh size corn gluten meal in two different buffers (Tris and citrate) heated at different temperatures and, in some instances, heated by different drying methods, was evaluated. Compost generally has a pH of about 5.

The results of this experiment, which are presented below in Table 1, show that heating under certain conditions can result in a decrease in the soluble protein level of 10–20 mesh size corn gluten meal.

TABLE 1

| | Percent Soluble Protein Content | |
|---|---|---|
| Drying Method | Tris Buffer, pH 7 | Citrate Buffer, pH 5 |
| Low Heat Drying (60° C. Oven Overnight) | 100% | 100% |
| High Heat Drying (170° C. Oven for 2.5 Hours) | 56% | 59% |
| Steam Tube Drying | 97% | 103% |
| Steam Tube Drying | 89% | 75% |
| Flash Drying | 103% | 96% |

EXAMPLE 5

Composition of 10–20 Mesh Size Corn Gluten Meal Heated at Different Temperatures In this experiment, the moisture, protein, fat, fiber and ash content of 10–20 mesh sized corn gluten meal heated at different temperatures and, in some instances, heated by different drying methods was calculated.

The results of this experiment are presented below in Table 2 in terms of percent weight of the total composition.

TABLE 2

| Drying Method | % Moisture | % Total Protein | % Fat | % Fiber | % Ash |
|---|---|---|---|---|---|
| Steam Tube Drying | 7.85% | 63.63% | 1.08% | 0.63% | 1.89% |
| Steam Tube Drying | 10.62% | 59.99% | 3.12% | 0.83% | 1.67% |
| Flash Drying | 7.58% | 66.47% | 1.26% | 0.58% | 1.46% |
| Low Heat Drying (60° C. Oven Overnight) | 3.66% | 66.44% | 2.39% | 0.6% | 1.6% |
| High Heat Drying (170° C. Oven for 2.5 Hours) | 1.12% | 69.49% | 0.95% | 0.66% | 1.76% |

EXAMPLE 6

Pot Test for Different Sizes of Corn Gluten Meal to Assess Temperatures of Nutrient Beds and Mushroom Yield In this experiment, which was conducted at a public mushroom research center, various size ranges of corn gluten meal treated in the manner described hereinabove for the production of the mushroom supplements of the present invention were placed into compost beds containing compost and spawn supplements The temperature of the compost bed was taken five days later (on Day 6). Temperature readings were also taken on Day 6 for an unsupplemented compost bed, and for a compost bed containing sized corn gluten meal having a size range of 10–20 mesh heated in a 60° C. oven overnight (low heat), heated in a 170° C. oven for 2.5 hours (high heat), steam tube dried or flash dried.

The results of this experiment are presented in Table 3 hereinbelow, in Table 4 hereinbelow, and in FIG. 4, and show that corn gluten meal having a 10–20 mesh size produced the lowest nutrient bed temperature over time. The particle size of the corn gluten meal appears to be the only factor which affected the temperature in the compost beds.

TABLE 3

| Heat Treatment and/or Particle Size Range of Corn Gluten Meal | Temperature (°F.) at Day 6 |
|---|---|
| 10–20 Mesh, Low Heat Dried (60° C. Oven Overnight) | 79° F. |
| 10–20 Mesh, High Heat Dried (170° C. oven for 2.5 hours) | 79° F. |
| >4 Mesh | 76° F. |
| 4–10 Mesh | 79° F. |
| 10–20 Mesh | 78° F. |
| 20–30 Mesh | 78° F. |
| 30–40 Mesh | 82° F. |
| 40–50 Mesh | 82° F. |
| 50–60 Mesh | 81° F. |
| 60–70 Mesh | 81° F. |
| 70–80 Mesh | 85° F. |
| <80 Mesh | 81° F. |
| 10–20 Mesh, Steam Tube Dried | 78° F. |
| 10–20 Mesh, Flash Dried | 77° F. |
| Unsupplemented | 76° F. |

In this experiment, the mushroom yield in pounds of mushrooms produced per square foot of nutrient bed was also determined for two breaks for nutrient beds supplemented with the treated corn gluten meal described above having different particle size ranges and, in some instances, having been dried in different manners, or unsupplemented. The results for this part of this experiment are presented below in Table 4.

TABLE 4

Mushroom Yield
(in Pounds Per Square Foot of Compost Bed)

| Heat Treatment and/or Particle Size of Corn Gluten Meal | 1st Break | 2nd Break | Total Yield |
|---|---|---|---|
| 10–20 Mesh | 1.14 | 0.38 | 1.52 |
| >10 Mesh | 1.12 | 0.45 | 1.57 |
| 20–30 Mesh | 0.55 | 0.51 | 1.06 |
| 30–40 Mesh | 0.67 | 0.17 | 0.84 |
| 40–60 Mesh | 0.3 | 0.2 | 0.5 |
| <60 Mesh | 0.14 | 0.06 | 0.2 |
| Unsupplemented | 1.12 | 0.86 | 2.00 |
| 10–20 Mesh, Steam Tube Dried | 1.64 | 0.53 | 2.13 |
| 10–20 Mesh | 1.49 | 0.51 | 2 |

Green mold grew in the pots containing the supplement of the invention, but not in the control (unsupplemented) pots. This caused the third break to need to be disposed of entirely, and is believed to have reduced the comparative mushroom yields of the pots containing the supplements, as shown in Table 4 above, thereby producing the illogical result, contradicted by other data contained herein, that the unsupplemented nutrient beds produced more mushrooms than the supplemented beds. These results do demonstrate, however, the benefits of using larger particle sizes, including those having a 10–20 mesh size, in that higher yields of mushrooms were produced with treated corn gluten meal having this size.

EXAMPLE 7

Three Mushroom Growing Trials Conducted at a Public Mushroom Research Center

Three separate mushroom growing trials employing the corn gluten meal supplements of the present invention were conducted at a public mushroom research center (MRC). The results of these trials are expressed in pounds of mushrooms yielded per square foot of growth medium.

In each of the three separate trials, ten-inch pots containing five pounds of compost spread five to six inches deep were used. In three of the sets of pots, five weight percent of the compost was replaced by one of the following supplements: (1) a mushroom supplement of the present invention; (2) Penwest Foods (Bellevue, Wash.) FASTBREAK PLUS supplement, which is a starch-coated corn gluten meal product; (3) Campbell's Fresh, Inc. (Napoleon, Ohio) S41 supplement, which is cracked soybeans coated with fungicide impregnated wax; and (4) no supplement. The data from these three trials is presented in Table 5 below.

TABLE 5

| Mushroom Supplement Employed | Pounds of Mushrooms Yielded per Square Food of Growth Medium | | |
|---|---|---|---|
| | Trial 1 | Trial 2 | Trial 3 |
| (1) Mushroom Supplement of the Invention | 2.99 | 4.26 | 3.15 |
| (2) FASTBREAK PLUS | *— | — | 1.97 |
| (3) Campbell's Fresh, Inc.'s S41 Product | 3.18 | 4.00 | — |
| (4) No Supplement | 2.18 | 2.72 | 2.58 |

*— means not tested.

As is shown in Table 5 above, the mushroom supplement of the invention significantly outperformed the nonsupplemented control and the FASTBREAK PLUS supplement in mushroom yield. It performed similarly in yield to the Campbell's Fresh, Inc. product, which is soybean-based.

Figure 5:
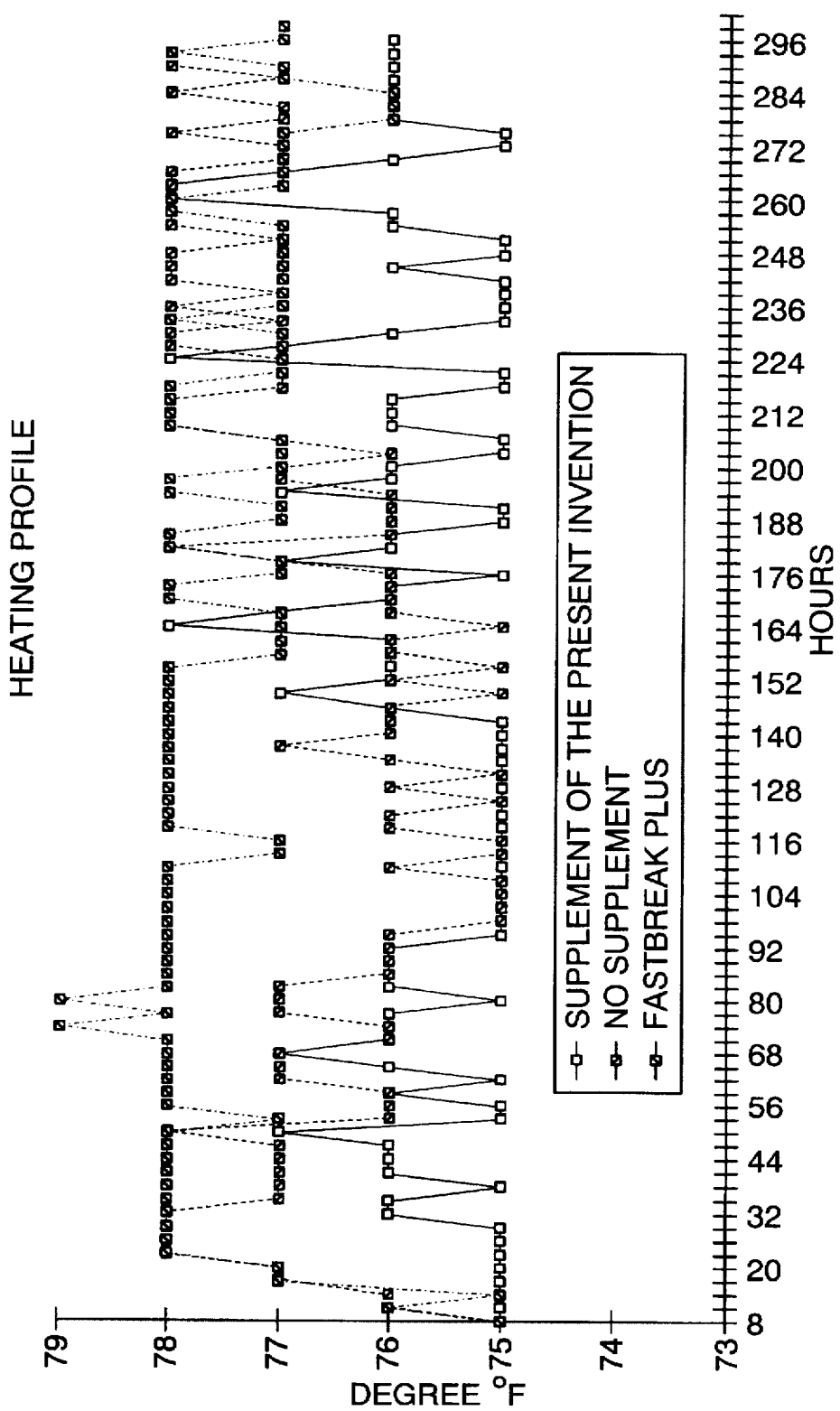
FIG. 5 is a plot of temperature in Fahrenheit degrees versus time in hours from 8 hours to 296 hours for the experiment described in Example 7, and shows a heating profile of nutrient beds containing the mushroom supplement of the invention, containing no supplement and containing FASTBREAK PLUS (U.S. Pat. No. 4,990,173).

FIG. 5 is a heating profile which demonstrates that nutrient beds containing the mushroom supplement of the invention generated lower temperatures over time than nutrient beds containing the FASTBREAK PLUS supplement, or the control bed containing no supplement.

EXAMPLE 8

Mushroom Growing Trial Conducted at a Commercial Farm

A mushroom growing trial employing a corn gluten meal supplement of the present invention was conducted at a commercial farm.

Six 1.86 square foot trays filled with a growth medium were employed with each of three different rates of supplementation with the corn gluten meal additive of the present invention: 3% supplement rate, 5% supplement rate and unsupplemented.

The results of this experiment are described in Table 6 below in pounds per square foot cased for four different breaks.

TABLE 6

| Supplement Rate | First Break | Second Break | Third Break | Total Yield |
|---|---|---|---|---|
| 3% Supplement Rate: | 3.11 | 2.64 | 1.31 | 7.97 |
| 5% Supplement Rate: | 3.36 | 2.60 | 1.50 | 7.45 |
| Unsupplemented: | 2.95 | 2.15 | 0.86 | 5.96 |

This data shows that, in each of the three breaks, more pounds of mushrooms were yielded when the supplement described above was added to the growth medium, with a rate of 5% supplementation resulting in more pounds of mushrooms yielded than a rate of 3% supplementation.

Figure 6:
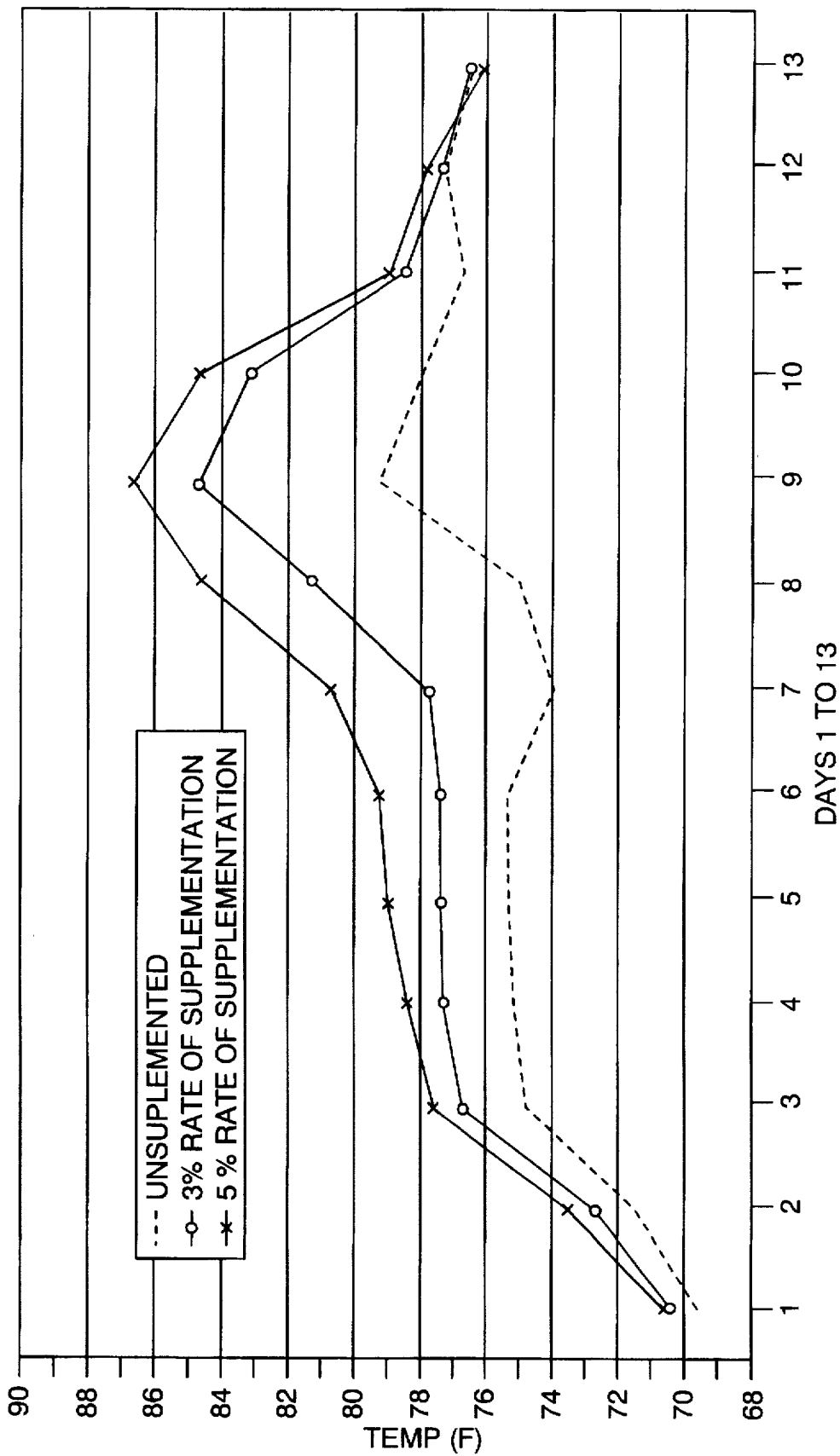
FIG. 6 is a plot of spawn run temperature in Fahrenheit degrees of the growth medium versus time in days from Day 1 to Day 13 for the experiment described in Example 8, in which the mushroom growth medium was unsupplemented, or was supplemented with an additive of the invention applied at a rate of 3%, or at a rate of 5%.
Figure 7:
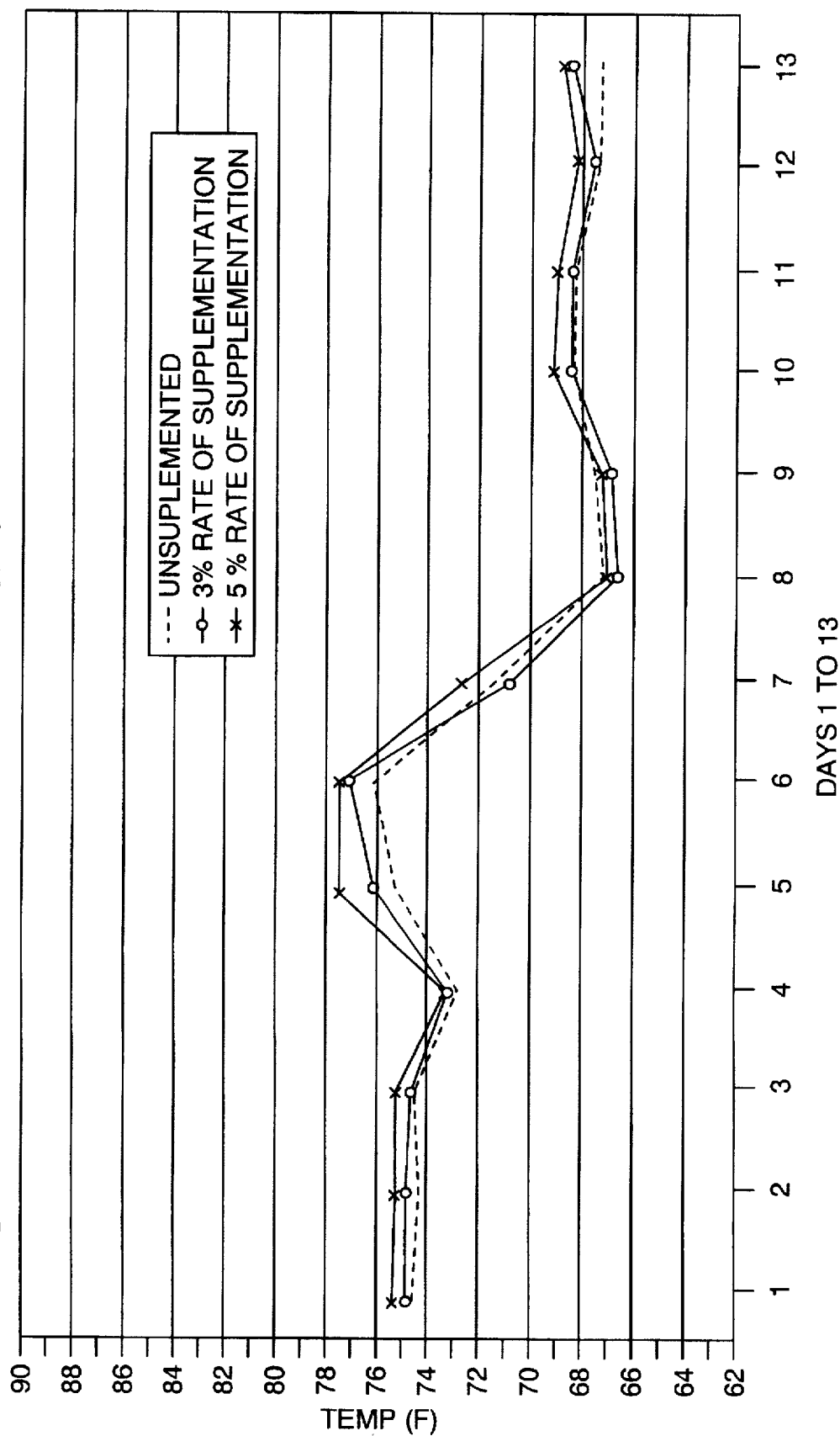
FIG. 7 is a plot of set-back temperature in Fahrenheit degrees of the growth medium versus time in days from Day 1 to Day 13 for the experiment described in Example 8, in which the mushroom growth medium was unsupplemented, or was supplemented with an additive of the invention applied at a rate of 3%, or at a rate of 5%.

Spawn run temperature data is presented in FIG. 6, and demonstrate acceptable temperatures at 3% and 5% rates of addition.

No significant molding of supplement particles was observed with respect to either the 3% or 5% rate of addition.

EXAMPLE 9

Large Scale Mushroom Growing Trial

A mushroom supplement of the invention and the Campbell's Fresh, Inc. S41 supplement described hereinabove were tested on a farm scale at a pubic mushroom test demonstration facility (MTDF). Trays of 48 containers containing a nutrient bed 8–10 inches deep and 13–14 square feet in top surface area were used, and the yields from four containers were aggregated.

There were 4 breaks analyzed in this experiment. The rate of supplementation on a dry compost weight basis of the Campbell's Fresh, Inc. product was 3%, while the mushroom supplement of the invention was applied to different nutrient beds at separate rates of 3% and 5%.

The results of this experiment are expressed in pounds of mushrooms yielded per square foot of growth medium. FIG. 8 shows that the mushroom supplement of the invention out-yielded the Campbell's Fresh, Inc. S41 product at both a 3% and a 5% supplement rate, with a 5% supplement rate of the mushroom supplement of the invention yielding more mushrooms.

EXAMPLE 10

Mushroom Growing Trial with a Supplement of the Invention and with an Amycel SpawnMate Product A mushroom growing trial comparing a corn gluten meal supplement of the present invention with a supplement which is commercially-available from Amycel SpawnMate, which consists of formaldehyde-treated soy grits, was conducted at a commercial farm.

The results of this experiment are shown in Table 7 below in pounds of mushrooms per square foot of growth medium.

TABLE 7

| Supplement Employed | Yield of Mushrooms |
|---|---|
| Mushroom Supplement of the Invention | 7.53 pounds/square foot |
| Amycel SpawnMate Product | 6.87 pounds/square foot |

These results show that, despite the mushroom industry's belief that corn gluten meal is unsuitable for nutrient supplements due to a predicted heat buildup in nutrient beds, and the mushroom industry's preference for soybean-based supplements, the mushroom supplement of the invention exhibited higher mushroom yields than the Amycel SpawnMate product.

EXAMPLE 11

Mushroom Growing Trial Conducted with Corn Gluten Meal Supplements Having Different Particle Size Ranges A mushroom growing trial using 4-inch pots was conducted at a public mushroom research center with corn gluten meal supplements (5% dry weight) produced by the method of the present invention having different particle size ranges (>10 mesh, 10–20 mesh, 20–40 mesh and <40 mesh).

The results of this trial are described in Table 8 below, and show that the best results were obtained when corn gluten meal supplements produced by the method of the present invention have a size range of from 10–20 mesh.

TABLE 8

| Size Range | Spawn Run Characteristics |
| --- | --- |
| >10 Mesh | Spawn growth was moderate, with some large pieces of supplement not attacked by the mushroom fungus, and some green mold present on supplement. |
| 10–20 Mesh | Spawn growth was excellent, with no mold present on the supplement. |
| 20–40 Mesh | Spawn growth was good, with no mold present on the supplement. |
| <40 Mesh | Spawn growth was poor, with no mold present on the supplement. |

Figure 4:
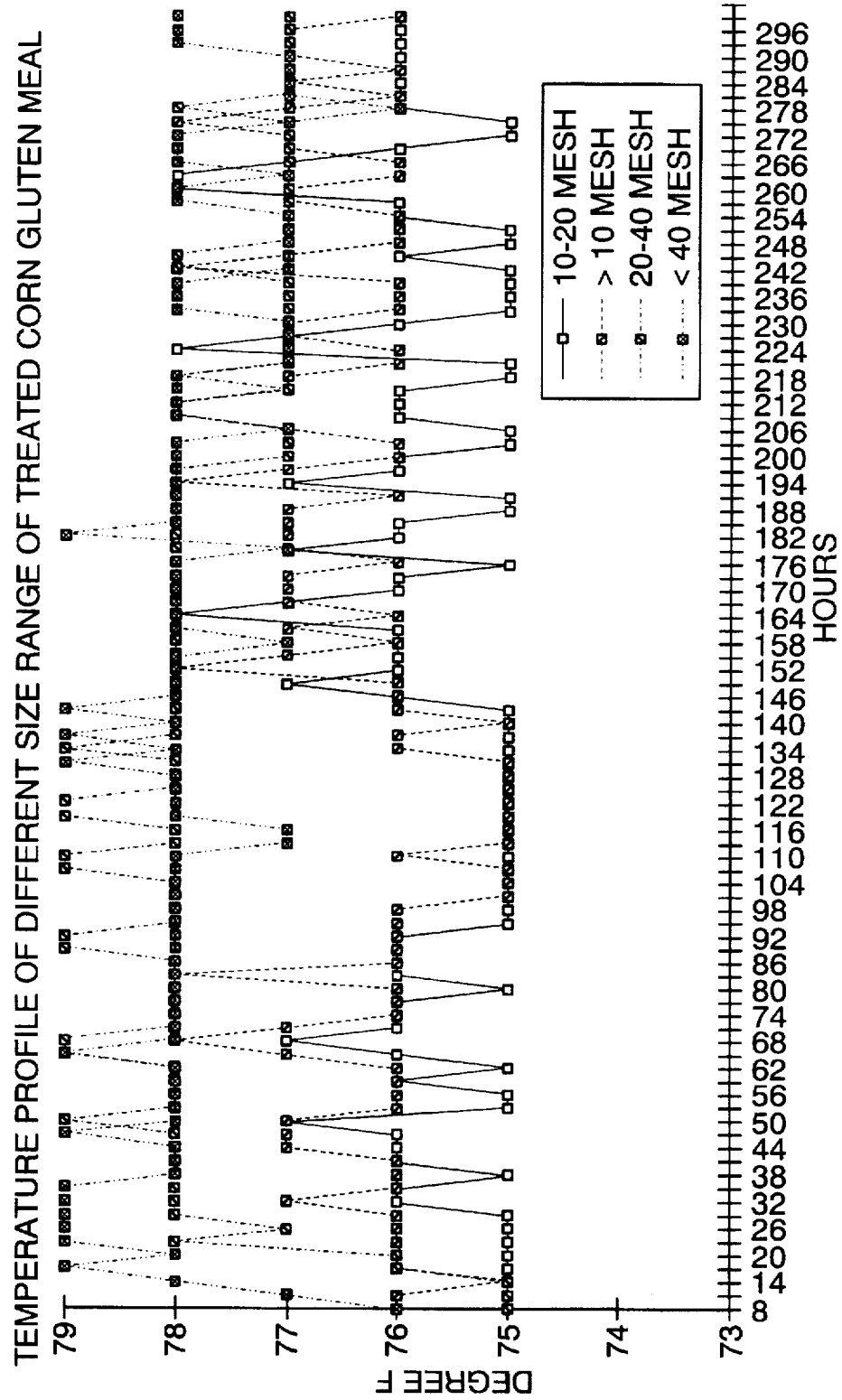
FIG. 4 is a plot of temperature in Fahrenheit degrees of the nutrient bed versus time in hours for the experiment described in Example 6 with respect to treated corn gluten meal having a particle size range of 10–20 mesh, >10 mesh, 20–40 mesh or <40 mesh.

The pot temperature profile of this experiment is present in FIG. 4. The results of this experiment show that particle size is the controlling factor influencing the compost heating profile, and that the 10–20 mesh product is the optimum product.

The foregoing examples are provided to enable one of ordinary skill in the art to practice the present invention. These examples are merely illustrative, however, and should not be read a limiting the scope of the invention as it is claimed in the appended claims.

While the present invention has been described herein with some specificity, and with reference to certain preferred embodiments thereof, those of ordinary skill in the art will recognize numerous variations, modifications and substitutions of that which has been described which can be made, and which are within the scope and spirit of the invention. For example, effective applications other than the preferred ranges set forth hereinabove may be applicable as a consequence of variations in the conditions employed in the cultivation of the fungi, and analogous considerations. Likewise, the specific agricultural effect observed may vary according to, and depending upon, the particular fungal supplement selected, or whether there are present certain other compost additives, as well as the type of formulation and mode of administration employed. Such expected variations and/or differences in the results are contemplated in accordance with the objects and practices of the present invention. It is intended therefore that all of these modifications and variations be within the scope of the present invention as described and claimed herein, and that the invention be limited only by the scope of the claims which follow, and that such claims be interpreted as broadly as is reasonable.

What is claimed is:

1. A non-chemically denatured nutrient supplement for enhancing the growth of fungi in a growth medium, the non-chemically denatured nutrient supplement consisting essentially of heated corn gluten meal having a particle size range of from about 10 to about 40 mesh, heated at a temperature of about 100° C. to about 120° C. for about 30 to about 300 minutes having a moisture content of less than about 10 weight percent and having a protein content of at least about 60 weight percent, based upon the total weight of the corn gluten meal, the non-chemically denatured nutrient supplement being effective for enhancing the growth of fungi in a growth medium and the non-chemically denatured nutrient supplement effective for providing reduced heating of the growth medium compared to a supplement which includes corn gluten meal which has not been heated.

2. The supplement of claim 1 wherein said particle size range is from about 10 to about 20 mesh.

3. The supplement of claim 2 wherein said fungi are mushrooms.

4. The supplement of claim 3 wherein said mushrooms are of the species *Agaricus bisporus*.

5. The supplement of claim 1 wherein said fungi are mushrooms.

6. The supplement of claim 5 wherein said mushrooms are of the species *Agaricus bisporus*.

7. The non-chemically denatured nutrient supplement of claim 1 wherein the nutrient supplement further comprises a hydrophobic coating material.

8. The non-chemically denatured nutrient supplement of claim 7 wherein the hydrophobic coating material is selected from the group consisting of natural resins, natural waxes, vegetable oils, mineral oils, animal fat, and mixtures thereof.

9. A non-chemically denatured nutrient composition comprising:

(a) a non-chemically denatured nutrient supplement amount which is effective for enhancing the growth of fungi, the non-chemically denatured nutrient supplement consisting essentially of heated corn gluten meal having a particle size range of from about 10 to about 40 mesh, heated at a temperature of about 100° C. to about 120° C. for about 30 to about 300 minutes having a moisture content of less than 10 weight percent and having a protein content of at least about 60 weight percent, based upon the total weight of the corn gluten meal, the non-chemically denatured nutrient supplement being effective for enhancing the growth of fungi in a growth medium and the non-chemically denatured nutrient supplement effective for providing reduced heating of the growth medium compared to a supplement which includes corn gluten meal which has not been heated; and (b) an agriculturally-acceptable carrier vehicle.

10. The composition of claim 9 wherein said particle size range is from about 10 to about 20 mesh.

11. The composition of claim 10 wherein said fungi are mushrooms.

12. The composition of claim 11 wherein said mushrooms are of the species *Agaricus bisporus*.

13. The composition of claim 9 wherein said fungi are mushrooms.

14. The composition of claim 13 wherein said mushrooms are of the species *Agaricus bisporus*.

15. The composition of claim 9 wherein said supplement is prepared without using formaldehyde.

16. A non-chemically denatured supplemented medium for growing fungi which comprises the admixture of:

(a) a non-chemically denatured nutrient supplement in an amount which is effective for enhancing the growth of fungi, the non-chemically denatured nutrient supplement consisting essentially of heated corn gluten meal having a particle size range of from about 10 to about 40 mesh, heated at a temperature of about 100° C. to about 120° C. for about 30 to about 300 minutes having a moisture content of less than 10 weight percent and having a protein content of at least about 60 weight percent, based upon the total weight of the corn gluten meal, the non-chemically denatured nutrient supplement being effective for enhancing the growth of fungi in a growth medium and the non-chemically denatured nutrient supplement effective for providing reduced heating of the growth medium compared to a supplement which includes corn gluten meal which has not been heated; and (b) a fungal growth medium.

17. The medium of claim 16 wherein said particle size range is from about 10 to about 20 mesh.

18. The medium of claim 17 wherein said fungi are mushrooms.

19. The medium of claim 18 wherein said mushrooms are of the species *Agaricus bisporus*.

20. The medium of claim 16 wherein said fungi are mushrooms.

21. The medium of claim 20 wherein said mushrooms are of the species *Agaricus bisporus*.

22. The supplemented medium of claim 16 wherein said particle size range is from about 10 to about 20 mesh.

23. The non-chemically denatured supplemented medium of claim 16 wherein the non-chemically denatured nutrient supplement further comprises a hydrophobic coating material.

24. The non-chemically denatured supplemented medium of claim 23 wherein the hydrophobic coating material is selected from the group consisting of natural resins, natural waxes, vegetable oils, mineral oils, animal fat, and mixtures thereof.

25. A process for growing fungi comprising mixing a growth medium containing growing fungi with a non-chemically denatured nutrient supplement in an amount which is effective for enhancing the growth of fungi, the non-chemically denatured nutrient supplement consisting essentially of heated corn gluten meal having a particle size range or from about 10 to about 40 mesh, heated at a temperature of about 100° C. to about 120° C. for about 30 to about 300 minutes having a moisture content of less than 10 weight percent and having a protein content of at least about 60 weight percent, based upon the total weight of the corn gluten meal, the non-chemically denatured nutrient supplement being effective for enhancing the growth of fungi in a growth medium and the non-chemically denatured nutrient supplement effective for providing reduced heating of the growth medium compared to a supplement which includes corn gluten meal which has not been heated.

26. The process of claim 25 wherein said particle size range is from about 10 to about 20 mesh.

27. The process of claim 26 wherein said fungi are mushrooms.

28. The process of claim 27 wherein said mushrooms are of the species *Agaricus bisporus*.

29. The process of claim 25 wherein said fungi are mushrooms.

30. The process of claim 29 wherein said mushrooms are of the species *Agaricus bisporus*.

31. The process of claim 25 wherein said nutrient supplement is admixed into said growth medium at the time of spawning.

32. The process of claim 25 wherein said nutrient supplement is admixed into said growth medium at the time of casing.

33. The process of claim 25 wherein said particle size range is from about 10 to about 20 mesh.

34. The process of claim 25 wherein the non-chemically denatured nutrient supplement further comprises a hydrophobic coating material.

35. The process of claim 34 wherein the hydrophobic coating material is selected from the group consisting of natural resins, natural waxes, vegetable oils, mineral oils, animal fat, and mixtures thereof.

36. A process for making a non-chemically denatured nutrient supplement for increasing the growth of fungi in a growth medium, the method consisting essentially of:

(a) slurrying in water a corn gluten meal having a protein content of at least about 60 weight percent, based upon the total weight of the corn gluten meal;

(b) heating the corn gluten meal slurry at a temperature of about 100° C. to about 120° C. for about 30 to about 300 minutes, the heated corn gluten meal having a moisture content of less than about 10 weight percent; and (c) sizing the corn gluten meal product to a particle size range of from about 10 to about 40 mesh, the non-chemically denatured nutrient supplement being effective for enhancing the growth of fungi in a growth medium and the non-chemically denatured nutrient supplement effective for providing reduced heating of the growth medium compared to a supplement which includes corn gluten meal which has not been heated.

37. The process of claim 36 wherein said particle size range is from about 10 to about 20 mesh.

38. The process of claim 37 wherein said fungi are mushrooms.

39. The process of claim 38 wherein said mushrooms are of the species *Agaricus bisporus*.

40. The process of claim 36 wherein said fungi are mushrooms.

41. The process of claim 40 wherein said mushrooms are of the species *Agaricus bisporus*.

42. The process of claim 36 wherein the process further comprises coating the non-chemically denatured nutrient supplement with a hydrophobic coating material.

43. The process of claim 42 wherein the hydrophobic coating material is selected from the group consisting of natural resins, natural waxes, vegetable oils, mineral oils, animal fat, and mixtures thereof.

44. A non-chemically denatured nutrient supplement for enhancing the growth of fungi in a growth medium, wherein the non-chemically denatured nutrient supplement is the product of the process consisting essentially of:

slurrying corn gluten meal in water, the corn gluten meal having a protein content of at least about 60 weight percent to provide a corn gluten meal slurry;

heating the slurry at a temperature of from about 100° C. to about 120° C. for about 30 to about 300 minutes, the heated corn gluten meal having a moisture content of less than about 10 weight percent based upon the total weight of the corn gluten meal; and sizing the nutrient supplement to a particle size range of from about 10 to about 40 mesh, the non-chemically denatured nutrient supplement being effective for enhancing the growth of fungi in a growth medium and the non-chemically denatured nutrient supplement effective for providing reduced heating of the growth medium compared to a supplement which includes corn gluten meal which has not been heated.

45. The supplement of claim 44 wherein said corn gluten meal is prepared without using formaldehyde.

46. The supplement of claim 44 wherein said fungi are mushrooms.

47. The supplement of claim 46 wherein said mushrooms are of the species *Agaricus bisporus*.

48. The supplement of claim 44 wherein said particle size range is from about 10 to about 20 mesh.

49. The supplement of claim 45 wherein said fungi are mushrooms.

* * * * *